(12) United States Patent
Jung et al.

(10) Patent No.: US 11,905,912 B2
(45) Date of Patent: Feb. 20, 2024

(54) PISTON OF AN INTERNAL COMBUSTION ENGINE

(71) Applicant: Mahle International GmbH, Stuttgart (DE)

(72) Inventors: Frank-Peter Jung, Stuttgart (DE); Philipp Licht, Stuttgart (DE); Rainer Scharp, Vaihingen (DE)

(73) Assignee: Mahle International GmbH ( * ) Notice: Subject to any disclaimer, the term of this patent is extended or adjusted under 35 U.S.C. 154(b) by 1120 days.

(21) Appl. No.: 16/500,813

(22) PCT Filed: Mar. 26, 2018

(86) PCT No.: PCT/EP2018/057650
§ 371 (c)(1),
(2) Date: Oct. 3, 2019

(87) PCT Pub. No.: WO2018/184894
PCT Pub. Date: Oct. 11, 2018

(65) Prior Publication Data
US 2022/0307444 A1 Sep. 29, 2022

(30) Foreign Application Priority Data

Apr. 4, 2017 (DE) .......................... 102017205716.5

(51) Int. Cl.
F02F 3/22 (2006.01)
F16J 1/09 (2006.01)
F02F 3/00 (2006.01)

(52) U.S. Cl.
CPC .................. F02F 3/22 (2013.01); F16J 1/09 (2013.01); F02F 2003/0061 (2013.01); F05C 2201/0448 (2013.01)

(58) Field of Classification Search
CPC ........ F02F 3/22; F02F 3/20; F02F 3/26; F16J 1/08; F16J 1/09; F01P 3/06; F01P 3/10; F02B 23/06
See application file for complete search history.

(56) References Cited

U.S. PATENT DOCUMENTS 6,647,861 B1    11/2003  Jacobi et al.
6,659,062 B1 *  12/2003  Issler .................. F02F 3/22
                                              123/193.6

(Continued)

FOREIGN PATENT DOCUMENTS

CN    103649508 A    3/2014
CN    104508286 A    4/2015

(Continued)

OTHER PUBLICATIONS

Machine translation, Detailed Description, DE102012014192A1, Scharp, publ'n date Jan. 2014, obtained from https://worldwide.espacenet.com/patent/, pp. 1-9. (Year: 2014).*

(Continued)

Primary Examiner — Grant Moubry
(74) Attorney, Agent, or Firm — Fishman Stewart PLLC

(57) ABSTRACT

A piston of an internal combustion engine is disclosed. The piston includes a piston head with a piston bowl, a ring part and an annular cooling channel arranged between the ring part and the piston bowl. A closure element is provided to close the cooling channel in a direction away from the piston bowl. At least one guiding element is arranged in the cooling channel. The at least one guiding element provides a lug facing in a direction of an inner cooling channel wall and disposed at least partially circumferentially. The lug of the at least one guiding element is structured and arranged to direct cooling oil present in the cooling channel towards an upper (Continued)

region of the inner cooling channel wall relative to the closure element to facilitate cooling the upper region.

7 Claims, 5 Drawing Sheets

(56) References Cited

U.S. PATENT DOCUMENTS

| | | | |
|---|---|---|---|
| 7,051,684 | B2 | 5/2006 | Bauer |
| 7,299,772 | B1 | 11/2007 | Hardin |
| 8,065,984 | B2 | 11/2011 | Issler et al. |
| 8,347,842 | B2 * | 1/2013 | Sadowski .......... F02F 3/22 123/193.6 |
| 9,228,480 | B2 * | 1/2016 | Wirkkala, II ......... F02F 3/0015 |
| 2013/0104838 | A1 * | 5/2013 | Spangenberg .......... F02F 3/003 123/193.6 |
| 2015/0354435 | A1 | 12/2015 | Wirkkala, II et al. |

FOREIGN PATENT DOCUMENTS

| | | |
|---|---|---|
| CN | 104541044 A | 4/2015 |
| CN | 204783309 U | 11/2015 |
| DE | 199 26 568 A1 | 12/2000 |
| DE | 10 2006 013 884 A1 | 9/2007 |
| DE | 11 2007 001 562 T5 | 5/2009 |
| DE | 10 2011 115 826 A1 | 4/2013 |
| DE | 10 2012 014 192 A1 | 1/2014 |
| DE | 10 2013 201 415 A1 | 7/2014 |
| DE | 10 2015 005 217 A1 | 10/2016 |
| EP | 1 372 904 A1 | 1/2004 |
| JP | 2003502557 A | 1/2003 |
| JP | 2005521833 A | 7/2005 |

OTHER PUBLICATIONS

English abstract for DE-10 2012 014 192.
English abstract for DE-10 2015 005 217.
English abstract for DE-10 2013 201 415.
Chinese Office Action with Search Report dated Dec. 2, 2020 related to corresponding Chinese Patent Application No. 201880020823.7.
Japanese Office Action dated Jan. 18, 2022 related to corresponding Japanese Patent Application No. 2019-554931.

* cited by examiner

PISTON OF AN INTERNAL COMBUSTION ENGINE

CROSS REFERENCE TO RELATED APPLICATION

This application claims priority to International Patent Application No. PCT/EP2018/057650 filed on Mar. 26, 2018, and German Patent Application No. 10 2017 205 716.5 filed on Apr. 4, 2017, the contents of each of which are hereby incorporated by reference in their entirety.

TECHNICAL FIELD

The present invention relates to a piston of an internal combustion engine comprising a piston head having a piston bowl and a ring part and a cooling channel disposed between them. The invention additionally relates to an internal combustion engine having at least one such piston.

BACKGROUND

A piston of the kind in question for an internal combustion engine comprising a piston head having a piston bowl and a ring part, and having an annular cooling channel arranged between the ring part and the piston bowl, which is closed in the downward direction by a closure element, is known from EP 1 372 904 B1. An inlet and an outlet, via which cooling oil is able to enter the cooling channel or exit therefrom once more, are usually arranged in this closure element. An internal wall of the cooling channel is formed at the same time usually by a region that is annular and U-shaped in cross section. If cooling oil is injected via an inlet opening into the cooling channel, this cooling oil is thrown around in the cooling channel because of the up-and-down movement of the piston and, in so doing, absorbs thermal energy and cools the piston at the same time.

During operation of the internal combustion engine, however, in particular a high thermal input takes place, and thus also a high temperature input into the piston at the bowl lip, that is to say at a radially inner and, at the same time, upper corner region of the cooling channel, which, in the most unfavorable circumstances, can result in carbonization of the cooling oil in the cooling channel at this point. Suchlike carbonization must be avoided at all costs, since an adhering film of carbonized oil reduces any heat transfer, whereby the cooling is impaired by cooling oil newly injected into the cooling channel at these points. In the case of pistons that are known from the prior art, almost uncontrolled back-and-forth agitation of the cooling oil in the cooling channel occurs in the process, whereby necessary and in particular locally defined cooling of the piston is not possible.

The present invention is thus concerned with the problem of proposing, for a piston of the type in question, an improved or at least an alternative embodiment, which in particular addresses the disadvantages that are known from the prior art.

This problem is solved according to the invention by the subject-matter of the independent claim(s). Advantageous embodiments are the subject-matter of the dependent claims.

SUMMARY

The present invention is based on the general idea of arranging at least one guiding element in the cooling channel of a piston of an internal combustion engine, said element being arranged and oriented in such a way that it directs cooling oil present in the cooling channel in the direction of an upper region of an inner cooling channel wall and, in so doing, cools said region, which is most affected by possible carbonization of the oil, with local enhancement. The inventive piston in this case exhibits, in a manner known per se, a piston head having a piston bowl and a ring part, wherein external grooves for accommodating piston rings are arranged in the ring part. A usually annularly configured cooling channel, which is closed in the downward direction by a closure element, is arranged in this case between the ring part and the piston bowl. The piston in this case is a monothermal piston, for example a one-piece steel piston, designated as being state-of-the-art. According to the invention, at least one guiding element is now arranged in the cooling channel, which guiding element has a lug facing in the direction of an inner cooling channel wall and disposed at least partially circumferentially, which is oriented in such a way that cooling oil present in the cooling channel is directed in the direction of an upper, and situated radially inwards, region of an inner cooling channel wall and thus efficiently cools said region, which is subjected to an increased temperature loading during operation of the internal combustion engine. In particular, carbonization of the oil occurring in this region under certain circumstances can be reliably prevented as a result. Suchlike carbonization of the oil must be prevented because, as the result of the formation of a film of carbonized oil here, a thermally insulating film is deposited on the inner surface of the cooling channel and additionally impairs the heat exchange at this point and thus also the cooling of the piston. The at least one guiding element in this case is preferably formed in such a way that the cooling channel is reduced to approximately 70 to 20% in its radial width at the height of the lug. The lug itself in this case is arranged at approximately half the height of the cooling channel, although it can also be arranged at least slightly higher or lower depending on the desired local cooling effect. With the inventive piston it is thus possible for the first time to provide enhanced cooling of the region of an upper point of the inner cooling channel wall that is especially vulnerable to carbonization of the cooling oil and, in the process, to achieve an improved cooling effect, which also increases the efficiency of the piston in particular.

In an advantageous further development of the inventive solution, the at least one guiding element is clamped between an underside of the ring part and the at least one closure element and is held in place in this way. Suchlike clamping permits the relatively simple assembly of the guiding element, whereby additional fixing means or fixing steps, for example soldering or gluing or welding, can be dispensed with. As an alternative hereto, it is also conceivable for the at least one guiding element to be clamped between an upper cooling channel wall and the at least one closure element and held in place in this way. For this purpose, it is possible, for example, simply to insert the at least one guiding element into the cooling channel and to fix it therein by insertion of the closure element. The at least one guiding element in this case preferably has appropriately formed contact regions, by means of which it bears against both an inner surface of the cooling channel and also the closure element and, in so doing, makes a predefined fixed position possible.

In a further advantageous embodiment of the inventive solution, the at least one guiding element forms a wall inclined in relation to a piston axis and at least in the form of an annular segment, which, together with an outer cooling channel wall of the cooling channel, forms a funnel-shaped cross section and, in a lower region or in recessed intermediate sections/interruptions, has outlet openings for cooling oil. In this case, the at least one guiding element forms only a kind of spoiler, which directs the cooling oil to the regions in the cooling channel requiring particular cooling. The cooling oil injected from below into the cooling channel encounters the guiding element and, in the event of an up-and-down movement, is directed to the latter along the upper region of the inner cooling channel wall, where the enhanced cooling is desired. Depending on the heat absorption that has occurred at that point, it flows along a preferably rounded upper cooling channel wall of the cooling channel and flows down again on the outer cooling channel wall, wherein, in conjunction with the next lifting movement, the cooling oil is once more thrown onto the upper cooling channel wall or along the inclined wall formed by the guiding element to the upper region of the inner cooling channel wall. After being thrown back and forth several times, it exits once more through the outlet openings or the interruptions arranged in the lower region of the guiding element.

In an advantageous further development of the inventive solution, the at least one guiding element is made of steel sheet or plastic. Both an execution in steel sheet and an execution in plastic permit weight-optimized manufacture, which is of advantage in particular because of the high accelerations of the piston. Of course, solid embodiments are also conceivable as an alternative.

In a further advantageous embodiment of the inventive solution, the lug has interruptions in the circumferential direction and thus permits the selective cooling of defined circumferential segments of the upper region of the inner cooling channel wall. It is particularly conceivable in this context for the lugs to be situated in particular in the region of a fuel injection jet, which, during operation of the internal combustion engine, causes a locally increased thermal input into the piston and also, as a result, requires locally increased cooling. The reasons for this are, for example, the usually six to ten jets of fuel produced by diesel injection nozzles, which leads to uneven heat distribution during combustion. As a result, hot and less hot points are present on a bowl lip of the piston, wherein the hot points lie in the region of the fuel jets. Temperature distribution in the piston can be homogenized by locally restricted cooling and by increased cooling in this locally restricted region, whereby the piston is exposed to lower thermal loadings.

In a further advantageous embodiment of the inventive solution, a catch funnel for catching a jet of cooling oil is formed on at least one guiding element, in particular being formed integrally therewith. A suchlike catch funnel can protrude in this case, for example, through a corresponding inlet opening in the closure element arranged below it, and, by so doing, can oblige clear positioning of the guiding element in the cooling channel. Costs and component diversity can be reduced further by the forming or the manufacture of a suchlike catch funnel in a single piece with the guiding element assembly.

In an advantageous further development of the inventive solution, the lugs exhibit folded edges on the interruptions. Suchlike folded edges cause the cooling oil present in the cooling channel to be guided most preferably in the direction of the region to be cooled in particular, such as the upper region of the inner cooling channel wall.

The present invention is further based on the general concept of equipping an internal combustion engine with at least one suchlike piston, wherein at least one piston guiding element exhibits lugs with interruptions, wherein an injection jet of fuel, in particular diesel fuel, is directed into an associated cylinder on an associated lug of the piston. This means in particular that the at least one guiding element is arranged in the cooling channel in such a way that each of the fuel jets injected into the cylinder by means of a fuel injection nozzle strikes a region of the piston bowl or a piston bowl edge, in which an associated lug is arranged in the region of the cooling channel. As a result, the increased thermal input occurring during operation of the internal combustion engine in conjunction with the combustion of the fuel jet in this locally restricted region of the piston is better compensated for by the increased supply of cooling oil in the cooling channel to the upper region of the inner cooling channel wall by means of the lugs of the guiding elements. In particular, an increase in the performance of the piston is also possible in this way.

Further important characterizing features and advantages of the invention can be appreciated from the dependent claims, from the drawings and from the associated description of the figures on the basis of the drawings.

It is understood that the characterizing features referred to above and described in more detail below are applicable not only in the respectively indicated combination, but also in other combinations or in isolation, without departing from the scope of the present invention.

Preferred illustrative embodiments of the invention are depicted in the drawings and are explained in more detail in the following description, wherein identical reference designations relate to identical or similar or functionally identical components.

BRIEF DESCRIPTION OF THE DRAWINGS

In the figures, in each case schematically.

DETAILED DESCRIPTION

Figure 13:
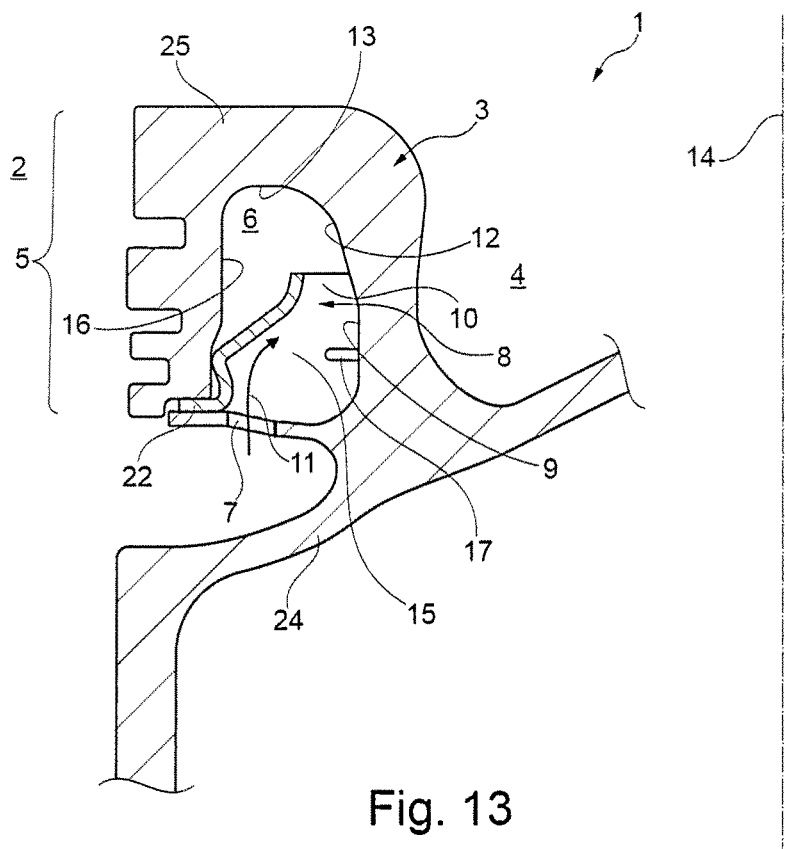
FIG. 13 depicts a sectioned view through an inventive piston, in which a closure element is configured integrally with the piston.

According to FIGS. 1 to 9 and 12 to 14, an inventive piston 1 of an internal combustion engine 2 exhibits a piston head 3 having a piston bowl 4 and a ring part 5. Circumferential grooves for accommodating piston rings (not depicted) are provided in this case in the region of the ring part 5. A substantially annular cooling channel 6, which is closed at the bottom by a closure element 7, is arranged between the ring part 5 and the piston bowl 4. In FIG. 13, the closure element 7 in this case is configured integrally with the piston 1, whereas it is configured as a separate component in the other representations. According to the invention, there is arranged in the cooling channel 6 at least one guiding element 8, which has a lug 10 facing in the direction of an inner cooling channel wall 9 and disposed at least partially circumferentially, which is oriented in such a way that cooling oil 11 present in the cooling channel 6 is directed in the direction of an upper region 12 of the inner cooling channel wall 9 and thus provides enhanced cooling of said region 12.

The region 12 here is subjected to the greatest temperature loading during operation of the internal combustion engine 2, for which reason the latent risk is always present in this region 12 of any cooling oil 11 impinging there being carbonized and, for example, adhering in the manner of a carbonizing oil film to the inner cooling channel wall 9 in the region 12 and even forming a thermally insulating film there, which impairs any heat transfer and thus any cooling of the piston 1.

With regard to the guiding elements 8 according to FIGS. 1, 2 and 4 to 9, 12 and 13, it can be appreciated that the respective guiding element 8 depicted there is clamped between an underside of the ring part 5 and the at least one closure element 7 and is secured thereby in position in the cooling channel 6. For this purpose, the guiding element 8 exhibits a flange 22, via which it is clamped between the closure element 7 and the underside of the ring part 5. Of course, the guiding element 8 can also be connected, for example welded, soldered or glued, with its lower flange 22 to the closure element 7 or to the underside of the ring part 5.

In a preferred embodiment, depicted in FIGS. 1 to 9, the underlying piston 1 is configured, in the manner known from EP 1 372 904 B1, in a single piece with a cooling channel 6 that is open at the bottom, which is closed by an annular steel sheet as a closure element 7. This is preferably supported resiliently under pre-load on protruding parts of the piston 1. However, the present invention can also be used advantageously with welded pistons 1, wherein the closure element 7 in this case, as depicted in FIG. 13, can also be a protruding part of one of the piston parts, here a lower piston part 24, which, after welding at least one contact zone to the other piston part, bears against an upper piston part 25 here. The guiding element 8 can be attached to one of the piston parts 24, 25 before welding, preferably by means of a laser. Apart from materially bonded connections, such as welding, soldering or gluing, the guiding element 8 can also be clamped between the two piston parts 24, 25 if these are in contact with one another under preloading.

Figure 11:
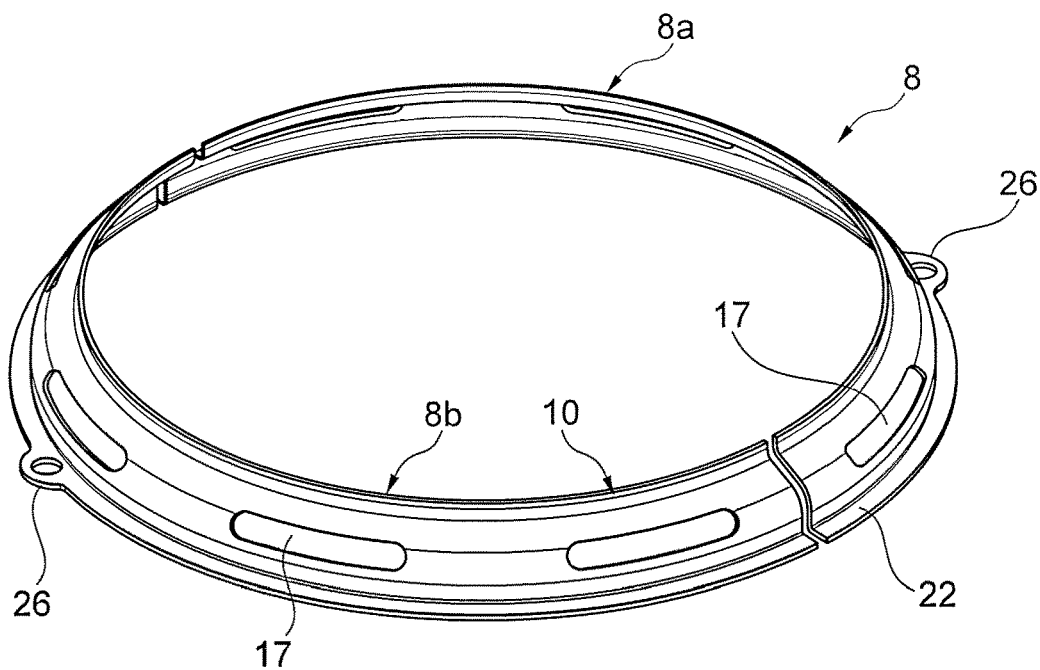
FIG. 11 depicts a representation as in FIG. 10, although without interruptions.
Figure 12:
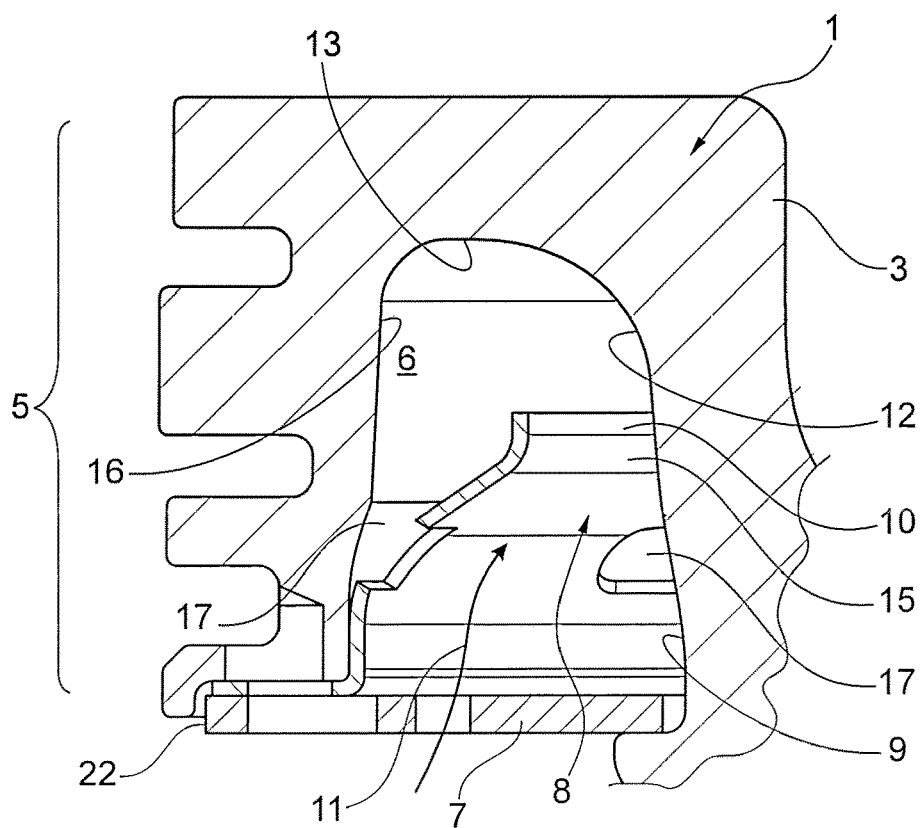
FIG. 12 depicts a sectioned view through an inventive piston of an internal combustion engine having a guiding element according to FIG. 11.

In practical terms, what is more, two or more separated guiding element segments 8a, 8b may, of course, also be necessary and provided, in order for the guiding element 8 to be able to move around the shaft regions as it is being inserted. An even subdivision into two segments 8a, 8b of 180° respectively is preferred and is realized especially if the guiding element 8 exhibits no outlet openings or an even number of outlet openings 17 or interruptions 18 in the circumferential direction. The guiding element 8 in this case is preferably divided by two radial cuts, as depicted in FIG. 11. An uneven division of the guiding element 8, other than 180°, can also be provided, therefore, in particular in the case of an unequal number of fuel jets 19 or outlet openings 17 or interruptions 18. A single, annularly closed guiding element 8 with only a single abutment is likewise conceivable, whereby it can be inserted by bending slightly upwards into the cooling channel 6. Above all, in the case of pistons 1 welded in the region of the cooling channel 6, consisting of an upper part and a lower part 25, 24, a single, annularly closed guiding element 8 can be used entirely without ban abutment, which guiding element is positioned on one of the piston parts 25, 24 before welding in the axial direction.

Figures 1, 2:
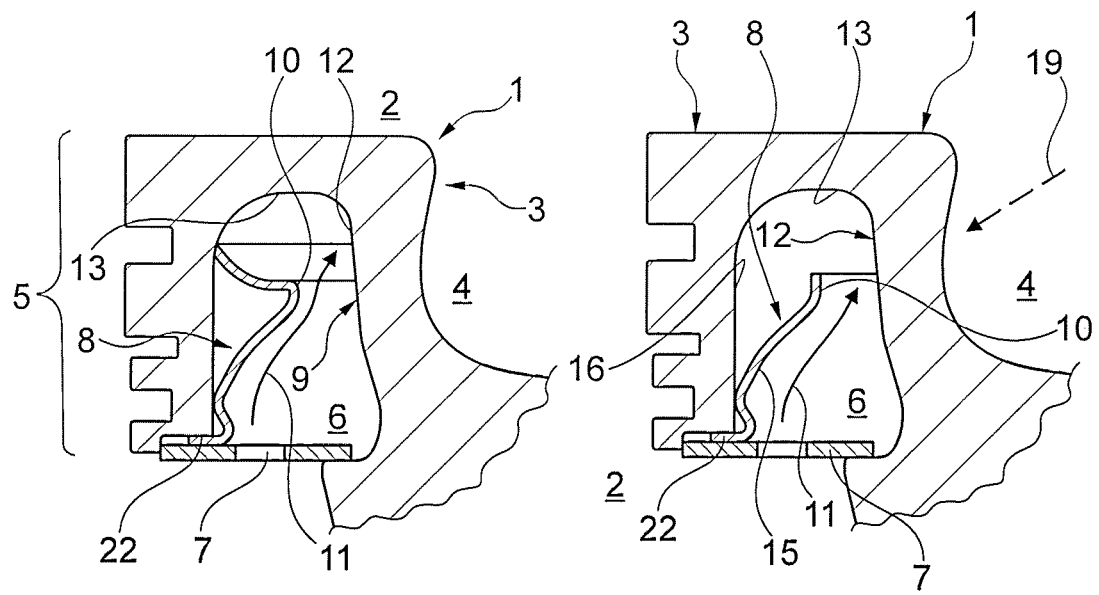
FIG. 1 depicts a sectioned view through an inventive piston of an internal combustion engine having an inventive guiding element corresponding to a first embodiment.
FIGS. 2 and 3 depict a representation as in FIG. 1, although with further possible embodiments of the inventive guiding element.
Figure 3:
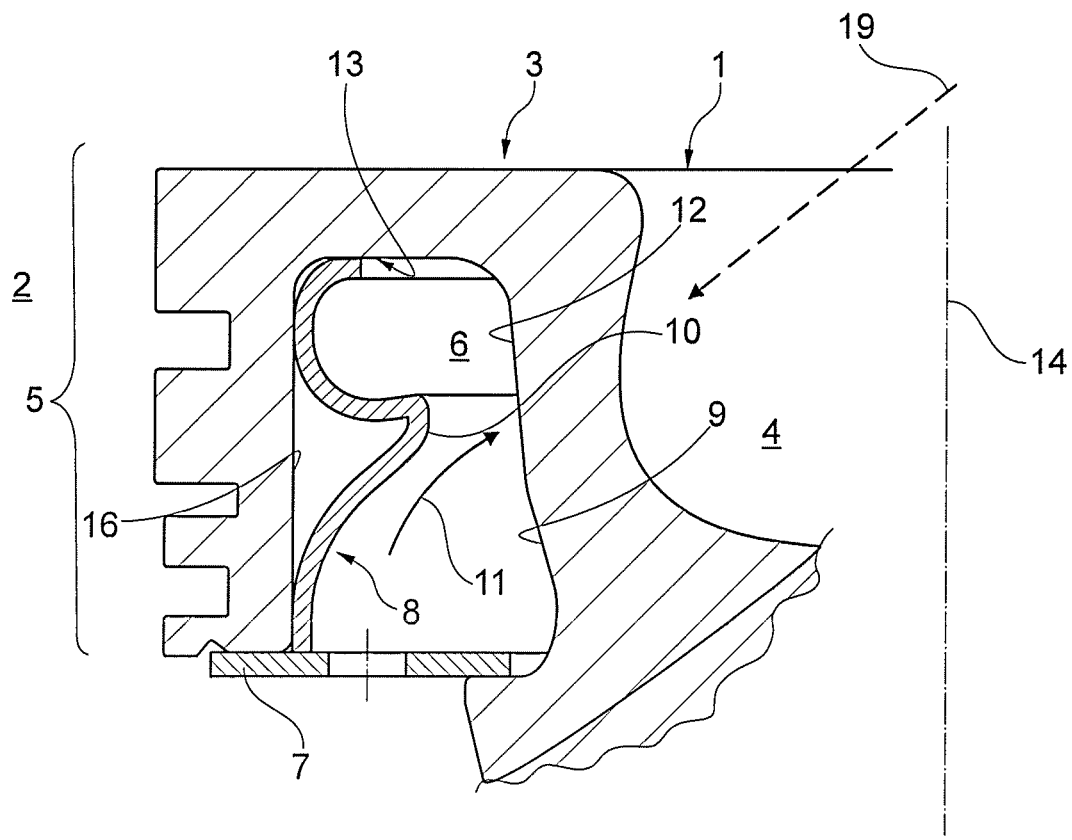
Figure 4:
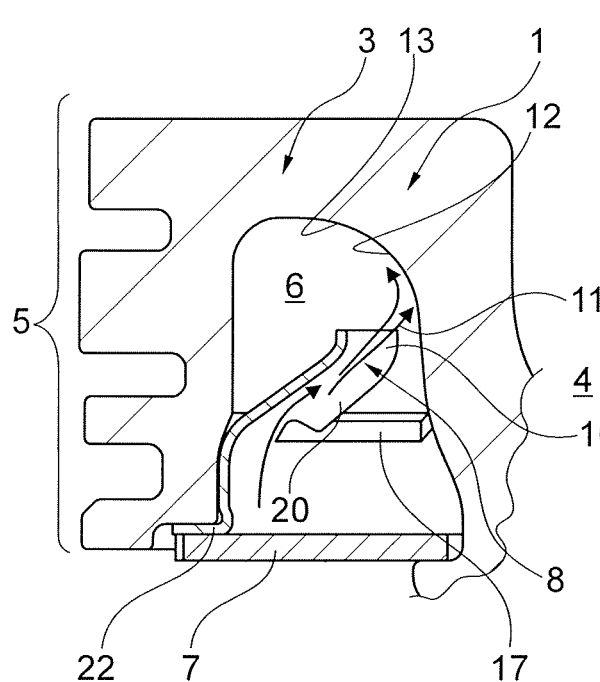
FIG. 4 depicts a sectioned view through an inventive piston in the region of a cooling channel and a lug of the guiding element.
Figure 5:
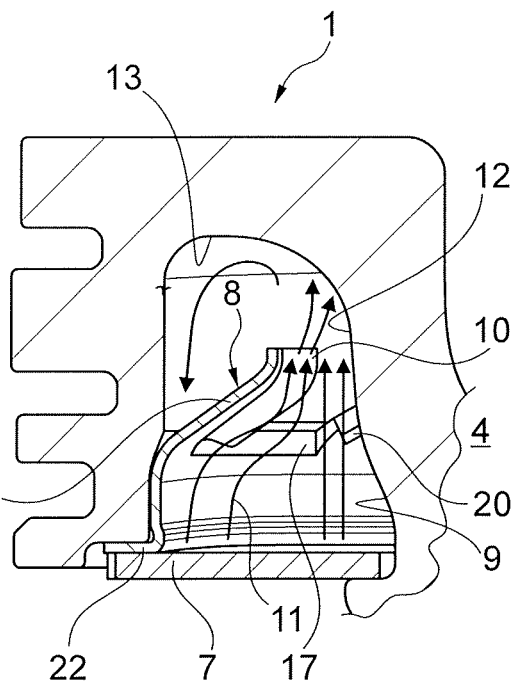
FIG. 5 depicts a flow path of cooling oil along the lug.
Figure 6:
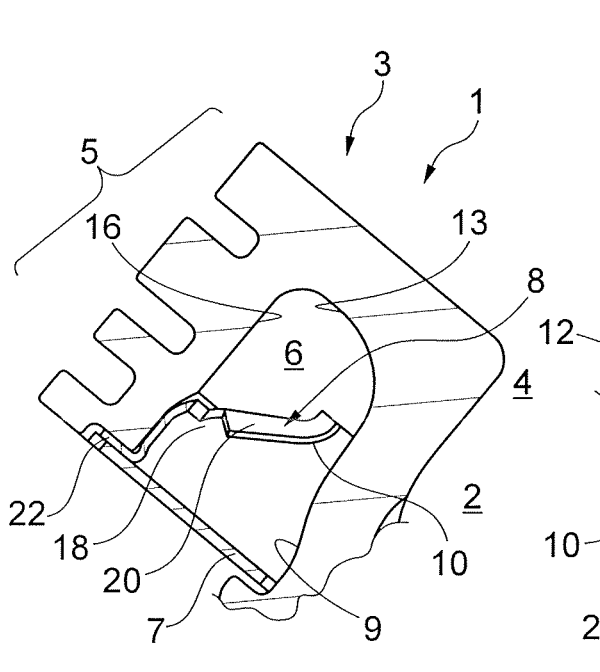
FIG. 6 depicts a sectioned view through an inventive piston in the region of an interruption.
Figure 7:
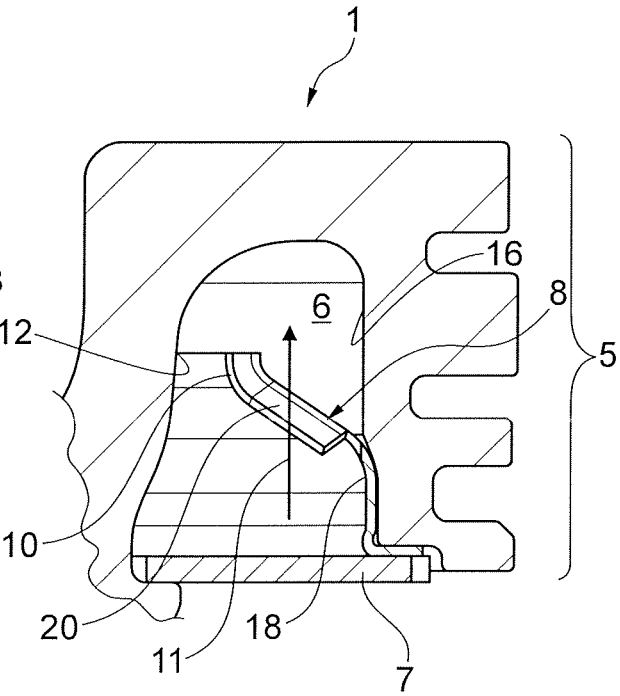
FIG. 7 depicts a representation as in FIG. 5, although with a flow path of the cooling oil in the interruption.
Figure 8:
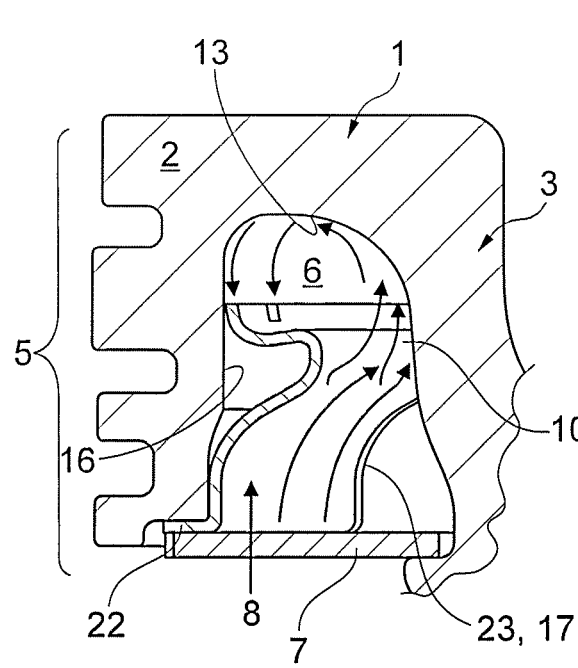
FIGS. 8 and 9 depict further representations of a guiding element, as in FIG. 1.
Figure 9:
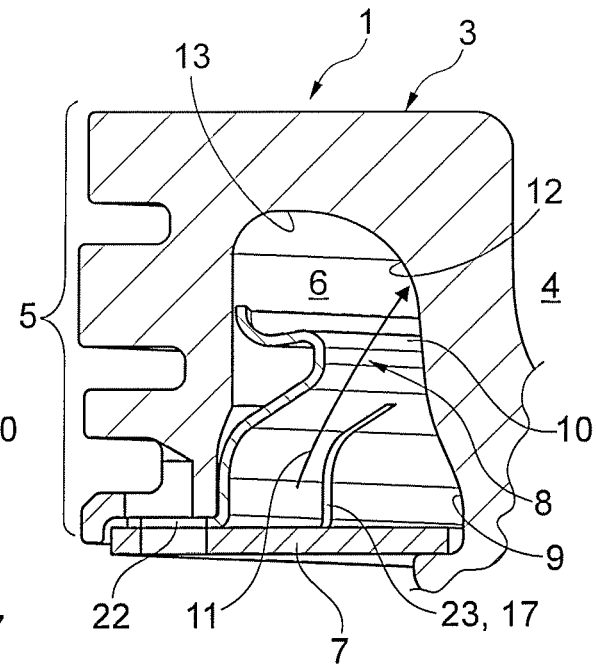

Notwithstanding the foregoing, a piston 1 is depicted in FIG. 3, in which the at least one guiding element 8 is clamped between an upper cooling channel wall 13 and the at least one closure element 7 and is held in place in this way. The guiding element 8 depicted according to FIG. 3, like the guiding element 8 depicted in the other figures, can be made of steel sheet or plastic and, as a result, can exhibit only a comparatively low weight, wherein it is also conceivable as an alternative, of course, for the guiding element 8 depicted in each case, in particular in FIG. 3, to be configured as a solid profile. A low weight of the guiding element 8 is of considerable advantage, in particular since the piston 1 is subjected to high accelerations during operation of the internal combustion engine 2 and, for this reason, even small increases in weight have a negative impact on the efficiency of the internal combustion engine 2.

With regard to the guiding elements 8 according to FIGS. 2 and 4 to 7, 10, 12 and 13, it can be appreciated that the respective at least one guiding element 8 depicted therein forms an inclined and radially inward-facing wall 15 or wall section 15 in relation to a piston axis 14 which corresponds substantially to the lug 10, wherein the wall 15 together with an outer cooling channel wall 16 forms a funnel-shaped cross section and, in a lower region, forms outlet openings 17 for the exit of the collected cooling oil 11. If suchlike outlet openings 17 are arranged in a relatively steep region of the guiding element 8, the oil as it flows in also receives an impulse in the inward direction. As a result, the narrowing of the guiding element 8 from bottom to top causes not only the concentration of an upward-facing oil flow 11 in the particularly hot bowl lip region 12, but also a rotation of the oil flow 11 in its entirety around the guiding element 8 (radially inside-upwards and outside-downwards), which contributes to more uniform heat distribution along the cooling channel surface.

The outlet openings 17 in this case can also be interruptions 18 arranged in the circumferential direction between the lugs 10. The interruptions 18 interrupt the individual lugs 10 of the guiding element 8 in the circumferential direction, whereby selective cooling of defined regions 12 of the inner cooling channel wall 9 is facilitated. This has a major role to play in particular in the use of the inventive piston 1 in a diesel internal combustion engine, since the diesel fuel is injected into this engine in the form of a jet by a diesel fuel injection nozzle, wherein higher temperature loadings occur in conjunction with the ignition of the mixture, in particular in the region of these individual fuel jets 19. No high temperatures occur between the individual jets 19, when viewed in the circumferential direction, such that temperature stresses may occur in the piston 1. It is consequently of particular advantage, if the individual lugs 10 of the guiding element 8 are oriented in such a way that they are in alignment with a possible fuel injection jet 19 in the radial direction (see FIGS. 2 and 3), whereby the piston bowl 4 can be cooled more effectively, especially in the regions 12 of the inner cooling channel wall 9, in which the highest temperature loading also occurs.

With further regard to the lugs 10, it can be appreciated in particular therefrom that folded edges 20 are provided on the interruptions 18, that is to say laterally on the lugs 10, which likewise support the direction of the jet of cooling oil 11 in the direction of the upper region 12 of the inner cooling channel wall 9.

Figure 10:
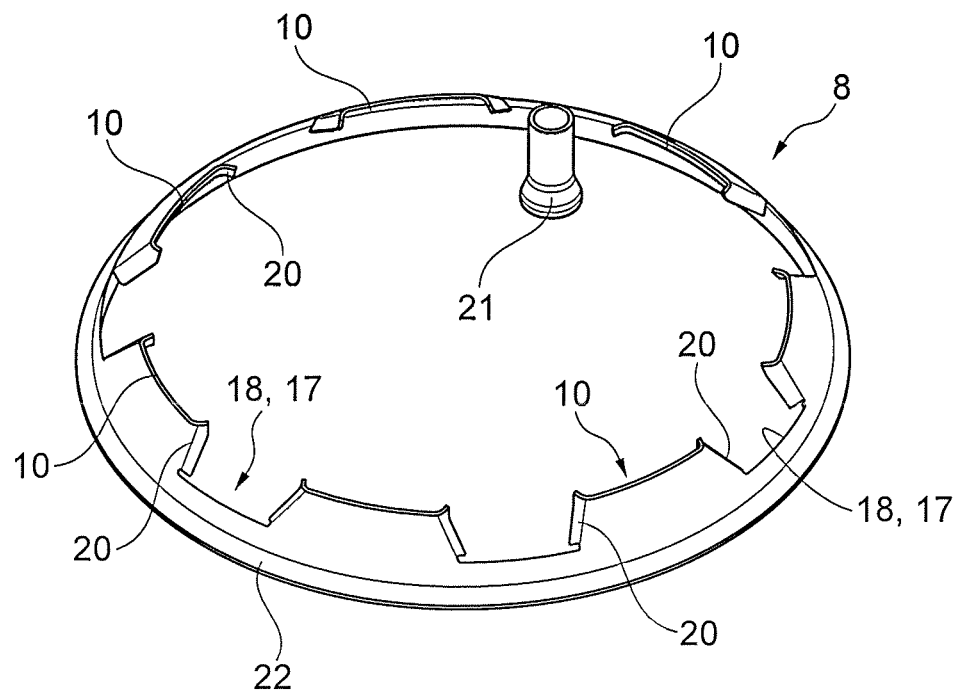
FIG. 10 depicts an annularly closed guiding element having lugs that are interrupted in the circumferential direction and a catch funnel formed thereon.

With additional regard to the guiding element 8 according to FIG. 10, it can be appreciated therefrom that a catch funnel 21 for catching a jet of cooling oil is formed, in particular being formed integrally therewith. A suchlike catch funnel 21 can be guided in this case through a corresponding opening, for example an inlet opening, in the closure element 7. The single-piece configuration of the catch funnel 21 with the guiding element 8, in particular enables the component diversity and, associated therewith, the assembly, storage and logistics costs to be reduced. In addition, the guiding element 8 can be arranged in a specific positional relationship to the closure element 7 and secured against rotation in the circumferential direction by the catch funnel 21, which engages in the inlet opening. In an advantageous manner, the catch funnel 21 can be arranged on one of the abutments of a guiding element 8, wherein a half catch funnel, which forms the catch funnel 21 engaging over the abutments together with the adjoining half-funnel, can be configured on each side of the abutment by bending up of the steel sheet. This simplifies the forming operation, since no enclosed openings need to be configured in the guiding element 8 in this case. In addition, a suchlike catch funnel engaging over the abutments can serve both of the parts concerned of the guiding element 8 as a protection against rotation, when it engages in the inlet opening of the closure element 7.

The closure element 7 itself can be fixed in its position in the circumferential direction in a manner known per se by protruding fixing lugs, which engage in recesses in the piston 1. In a similar manner, a guiding element 8 can also be positioned directly in the circumferential direction in its desired positional relationship to the piston 1 and secured against rotation, in which it has its own radially protruding fixing lugs 26, depicted in FIG. 11, which engage in corresponding recesses, for example, a milled recess at the lower end of the ring part 5.

With the inventive guiding element 8, which, as depicted in FIG. 10, can be configured as a closed ring or can also be assembled from a number of individual guiding element segments, it is possible for the first time to provide the locally restricted and predefined cooling of individual regions 12 of a piston bowl 4 of the piston 1 which are exposed to a particularly high temperature loading. Because of the guiding element 8 and the lugs 10 of same which protrude radially inwards, an annular cross section is maintained in the region of the inner cooling channel wall 9, through which the cooling oil 11 flows along close to the inner cooling channel wall 9, concentrated at the critical point, that is to say in the upper region 12, and cools these intensively before it flows to the outside, for example via a round configuration of the upper cooling channel wall 13. Without the inventive guiding element 8, a purely up-and-down movement would be available for the full width of the channel, but with low cooling intensity.

Figure 14:
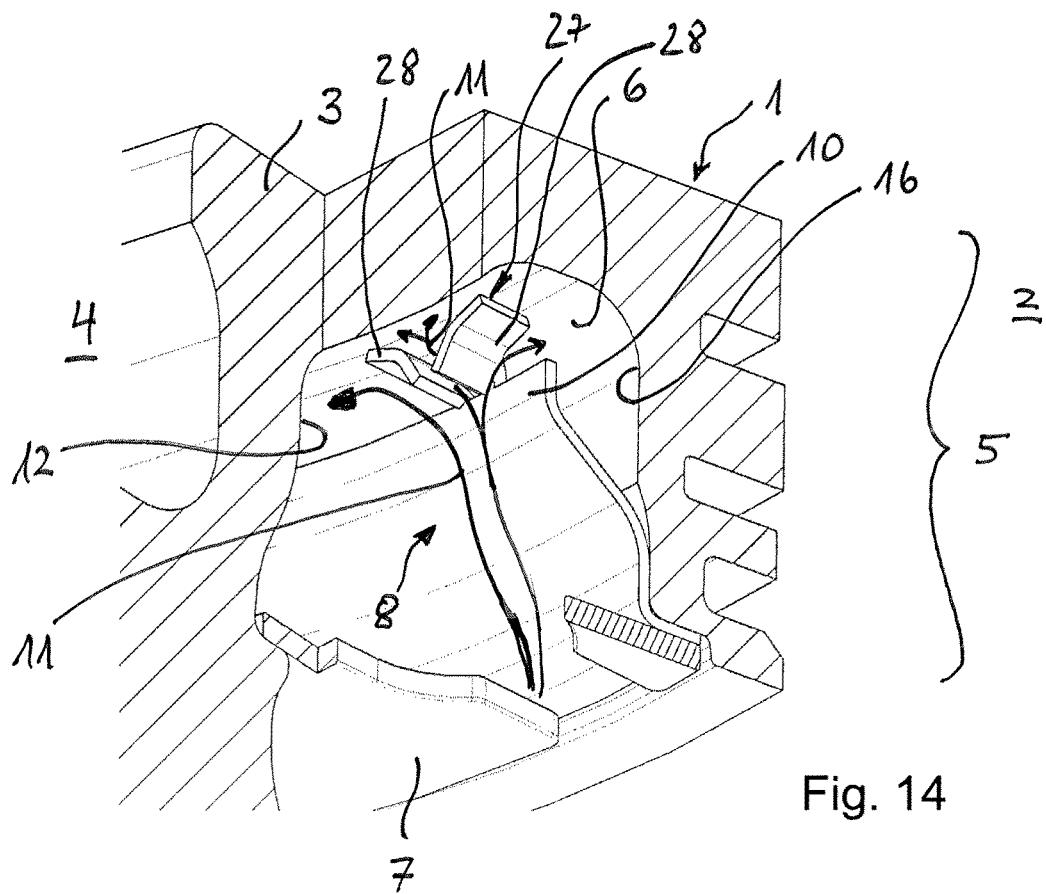
FIG. 14 depicts a sectioned view through an inventive piston having a jet splitter with two guide contours.

With regard to FIG. 14, it can be appreciated that a jet splitter 27 for splitting the jet of cooling oil 11 is arranged on at least one guiding element 8. This can have at least one guide contour 28 facing in the circumferential direction of the cooling channel 6. According to FIG. 14, however, the jet splitter 27 has two guide contours 28 positioned opposite one another and facing in the circumferential direction of the cooling channel 6.

The two guide contours 28 are arranged at a distance from one another, so that a jet of cooling oil 11 is able to pass between the two. As a result, the region directly above the jet splitter 27 can also be supplied with cooling oil 11 and cooled. The jet splitter 27 and/or the at least one guide contour 28 is/are glued, welded or soldered to the guiding element 8. There is a particular preference here for a single-piece configuration of the guide contours 28 with the guiding element 7. The guiding element 7 could thus be made as a cost-effective sheet metal part.

Generally, is it also conceivable for the at least one guiding element 8 to have slots 23, which, on the one hand, permit greater flexibility of the guiding element 8 and, on the other hand and under certain circumstances, form outlet openings 17 at the same time.

The invention claimed is:

1. A piston of an internal combustion engine, comprising:
   a piston head including a piston bowl, a ring part and an annular cooling channel arranged between the ring part and the piston bowl, wherein the cooling channel is closed in a direction away from the piston bowl by a closure element;
   at least one guiding element arranged in the cooling channel, the at least one guiding element providing a lug facing in a direction of an inner cooling channel wall and disposed at least partially circumferentially, wherein the lug of the at least one guiding element is structured and arranged to direct cooling oil present in the cooling channel towards an upper region of the inner cooling channel wall relative to the closure element to facilitate cooling the upper region;
   wherein the at least one guiding element is clamped and held between an underside of the ring part and the closure element; and
   wherein the at least one guiding element has a lower flange extending radially and circumferentially between the underside of the ring part and the closure element, the lower flange extending circumferentially around the at least one guiding element.

2. The piston as claimed in claim 1, wherein the at least one guiding element provides a wall inclined in relation to a piston axis, and wherein the wall together with an outer cooling channel wall defines a funnel-shaped cross section and in a lower region has outlet openings for cooling oil, the lower region disposed between the lug and the closure element.

3. The piston as claimed in claim 1, wherein the at least one guiding element is composed of a steel sheet or a plastic.

4. An internal combustion engine, comprising:
   at least one piston including:
   a piston head including a piston bowl, a ring part and an annular cooling channel arranged between the ring part and the piston bowl;
   a closure element structured and arranged to close the cooling channel in a direction away from the piston bowl; and
   at least one guiding element arranged in the cooling channel, the at least one guiding element providing a lug facing in a direction of an inner cooling channel wall and disposed at least partially circumferentially, wherein the lug of the at least one guiding element is structured and arranged to direct cooling oil present in the cooling channel towards an upper region of the inner cooling channel wall relative to the closure element to facilitate cooling the upper region;

wherein the at least one guiding element has a lower flange extending radially and circumferentially around the at least one guiding element, the lower flange being clamped and held between an underside of the ring part and the closure element.

5. The internal combustion engine as claimed in claim 4, wherein the at least one guiding element provides a wall inclined in relation to a piston axis, and wherein the wall together with an outer cooling channel wall of the cooling channel defines a funnel-shaped cross section and has at least one outlet opening for cooling oil in a lower region between the lug and the closure element.

6. The internal combustion engine as claimed in claim 4, wherein the at least one guiding element has at least one slot extending axially along a lower region of the at least one guiding element, the lower region disposed between the lug and the lower flange.

7. A piston of an internal combustion engine, comprising:
   a piston head including a piston bowl, a ring part and an annular cooling channel arranged between the ring part and the piston bowl;
   a closure element structured and arranged to close the cooling channel in a direction away from the piston bowl;
   at least one guiding element arranged in the cooling channel, the at least one guiding element providing a lug facing in a direction of an inner cooling channel wall and disposed at least partially circumferentially, wherein the lug of the at least one guiding element is structured and arranged to direct cooling oil present in the cooling channel towards an upper region of the inner cooling channel wall relative to the closure element to facilitate cooling the upper region;
   wherein the at least one guiding element provides a wall inclined in relation to a piston axis; and
   wherein the at least one guiding element is clamped and held between an underside of the ring part and the closure element; and
   wherein the at least one guiding element has at least one slot extending axially along a lower region of the at least one guiding element, the lower region disposed between the lug and the closure element.

\* \* \* \* \*